United States Patent [19]

Suzuki et al.

[11] Patent Number: 5,327,407
[45] Date of Patent: Jul. 5, 1994

[54] TRACKING CONTROL APPARATUS FOR GENERATING SAWTOOTH TRACKING CONTROL SIGNAL FROM SINUSOIDAL TRACKING ERROR SIGNAL

[75] Inventors: Motoyuki Suzuki; Yoshio Suzuki, both of Yokohama; Yukio Fukui, Machida, all of Japan

[73] Assignee: Hitachi, Ltd., Tokyo, Japan

[21] Appl. No.: 832,406

[22] Filed: Feb. 7, 1992

[30] Foreign Application Priority Data

Feb. 7, 1991 [JP] Japan .................................. 3-016336

[51] Int. Cl.⁵ .............................................. G11B 7/095
[52] U.S. Cl. ............................... 369/44.25; 369/44.28; 369/44.32; 369/44.34; 369/54
[58] Field of Search .................... 369/32, 44.25, 44.28, 369/44.29, 44.32, 44.34, 44.35, 54

[56] References Cited

U.S. PATENT DOCUMENTS

| | | | |
|---|---|---|---|
| 4,796,246 | 1/1989 | Tsuyoshi et al. | |
| 4,853,918 | 8/1989 | Kobayashi et al. | |
| 4,866,688 | 9/1989 | Ohtake et al. | 369/44.28 X |
| 5,121,370 | 6/1992 | Yanagi | 369/44.28 X |
| 5,140,573 | 8/1992 | Ando | 369/44.28 |
| 5,163,034 | 11/1992 | Kitai et al. | 369/44.28 X |

FOREIGN PATENT DOCUMENTS

| | | |
|---|---|---|
| 0069549 | 1/1983 | European Pat. Off. . |
| 0301791 | 2/1989 | European Pat. Off. . |
| 0318443 | 5/1989 | European Pat. Off. . |
| 0404942 | 1/1991 | European Pat. Off. . |
| 63-181179 | 7/1988 | Japan . |

OTHER PUBLICATIONS

Uekawa, Y., et al, "The development of digital servo algorithms for optical disc players," IEEE Transactions on Consumer Electronics, vol. 36, No. 3, Aug. 1990, pp. 567–571.
Patent Abstracts of Japan, vol. 9, No. 2 (P-325) [1725], Jan. 8, 1985 & JP59-152565.

Primary Examiner—W. R. Young
Attorney, Agent, or Firm—Antonelli, Terry, Stout & Kraus

[57] ABSTRACT

A tracking control apparatus includes an A/D converter, an edge detection circuit, a latch circuit and a ROM to change a tracking error signal having a sinusoidal characteristic representing a relative position of a light beam and a track on a disk to have a sawtooth characteristic representing the relative position. Stable tracking control free from off-tracking due to a disturbance is attained even when amplitudes of the tracking error signal and a tracking sum signal are not equal.

10 Claims, 8 Drawing Sheets

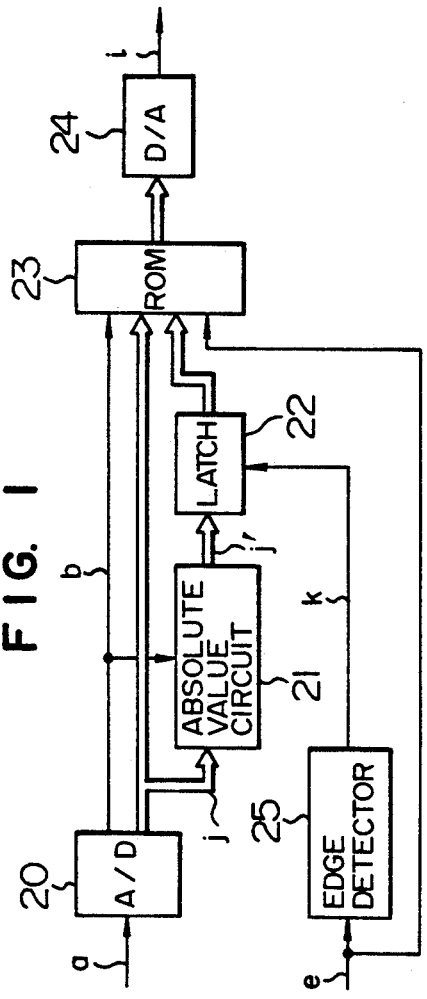
FIG. I
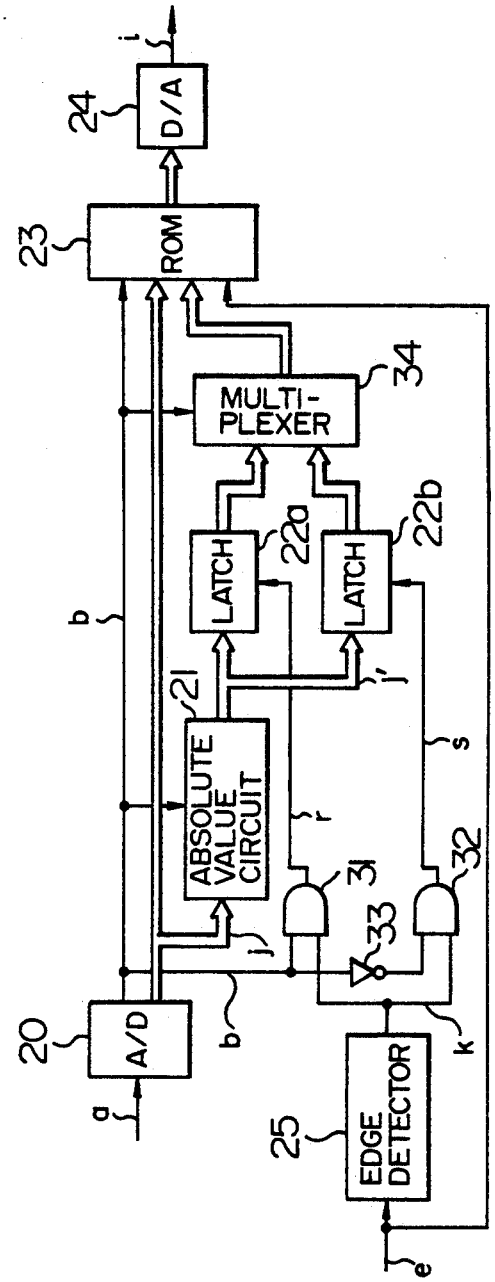
FIG. 3

TRACKING CONTROL APPARATUS FOR GENERATING SAWTOOTH TRACKING CONTROL SIGNAL FROM SINUSOIDAL TRACKING ERROR SIGNAL

BACKGROUND OF THE INVENTION

An optical disk or a magneto-optical disk which uses an optical or magneto-optical signal recording system has recently been developed, and an optical recording and reproducing apparatus for recording and reproducing information to and from such a disk has also been developed. In such an apparatus, a tracking actuator is driven in accordance with a polarity and a level of a tracking error signal produced by an optical pickup to attain tracking control so that a track center is always followed without regard to an eccentricity of the disk.

On the other hand, in order to improve a data transfer speed from the disk to a processor, the rotation speed of the disk is increased and a relative speed between a light beam and the track has been increased in spite of the reduction of the eccentricity of the disk. If the relative speed is lower than a pull-in speed determined by a tracking control band, the light beam is pulled onto, a target track but if it is higher than the pull-in speed, the pull-in is unstable and the light beam may be pulled onto a different track. As a result, in an access operation which requires a jump over tracks, the light beam may be pulled onto a track which is far distant from the target track and reaccess operation is needed. Thus, an access time is long.

JP-A-63-181179 discloses a solution to the above problems.

In the disclosed method, tracking is properly attained when amplitudes of a tracking error signal and a tracking sum signal are equal, but the waveform amplitudes are not equal in a disk in which a track groove depth varies. Thus, the disclosed method is not applicable to such a disk.

In the disclosed method, an allowable range for the pull-in to the target track is $|X| < P/2$ when P is a track pitch and X is a deviation of the light beam in a radial direction, measured from the target track. Thus, the pull-in to the target track is not attained when $|X| > P/2$. (X represents an absolute value of X).

SUMMARY OF THE INVENTION

It is an object of the present invention to provide a tracking control apparatus which attains stable pull-in to a target track even if waveform amplitudes of a tracking error signal and a tracking sum signal are not equal or even if a light beam is positioned in an area of $|X| > P/2$, and which performs an access operation with a short access time.

In order to achieve the above object, embodiments of the present invention have the following aspects:

In a first aspect, a tracking control apparatus comprises:

an information recording and reproducing medium having tracks for recording and reproducing information; an optical system including an objective lens for focusing a light beam onto the information recording and reproducing medium; a tracking device for driving the light beam transversely to the tracks; a tracking error detection device for detecting a positioning error between the light beam and a target track; an on-track detection device for detecting whether the light beam is on the target track or off the target track; and a tracking control device for controlling the tracking device in accordance with the output of the tracking error detection device such that the light beam follows the target track.

The tracking control apparatus is provided with a signal generation device for generating a signal proportional to the displacement between the light beam and the target track based on the output of the tracking error detection device and the output of the on-track detection device. The output of the signal generation device is applied to the tracking control device as a control signal.

In a second aspect, the signal generation device comprises: an analog/digital conversion device for digitizing the output of the tracking error detection device; an amplitude detection device for detecting the amplitude of the output of the tracking error detection device; a memory device for storing the output of the analog/digital conversion device, the output of the amplitude detection device, the output of the on-track detection device and the displacement between the light beam and the target track; and a digital/analog conversion device for converting the output of the memory device to an analog signal.

In a third aspect, the signal generation device comprises: an analog/digital conversion device for digitizing the output of the tracking error detection device; an amplitude detection device for detecting the amplitude of the output of the tracking error detection device; a memory device for storing the output of the analog/digital conversion device, the output of the amplitude detection device, the output of the on-track detection device and the displacement between the light beam and the target track; a counter device for counting up and down under control of the outputs of the tracking error detection device and the on-track detection device; a data processing device for processing the output of the memory device in accordance with the output of the counter device; and a digital/analog conversion device for converting the output of the data processing device to an analog signal.

The data processing device detects the displacement between the light beam and the target track and the direction thereof by the count of the counter means and supplies the output of the memory device, when the light beam is on the target track, and supplies the output of the counter device, when the light beam is off the target track, to the digital/analog conversion device through the data processing device.

In a fourth aspect, the counter device includes an external input setting device for externally setting a count.

According to the above aspects, the embodiments of the present invention can change a tracking error signal having sinusoidal characteristic to the relative position of the light beam and the track to have a linear characteristic representing the relative position by the signal generation device even when the waveform amplitudes of the tracking error signal and the tracking sum signal are not equal and the amplitude ratio is not constant.

Further, the displacement from the target track and the direction thereof are detected by the counter device and the tracking error signal is corrected in accordance with the displacement and the direction. As a result, the signal level is zero only at the target track and there is only one pull-in stable point.

Accordingly, a force toward the target track acts on the actuator which drives the light beam and the light beam is positively pulled onto the target track.

BRIEF DESCRIPTION OF THE DRAWINGS

FIG. 1 shows a block diagram of a first embodiment of the present invention,

FIG. 3 shows a block diagram of a second embodiment of the present invention,

DETAILED DESCRIPTION OF THE PREFERRED EMBODIMENTS

In FIG. 1, a tracking error signal (a) (see FIG. 2) is applied to an A/D converter 20 and converted to digital signals, that is, a polarity signal (b) representing a polarity of the tracking error signal (a) and a signal (j) representing an amplitude. Since an output of the A/D converter 20 is usually in an offset binary form, bits "1" and "0" of the signal (j) representing the amplitude are inverted depending on the polarity of the tracking error signal (a).

For example, assuming that the amplitude signal (j) at +1V of the tracking error signal (a) is (0100010), the amplitude signal (j) at −1V of the tracking error signal (a) is (1011101). An absolute value circuit 21 checks the polarity signal (b) and if the tracking error signal (a) is negative, the bits "1" and "0" of the amplitude signal (j) are inverted and a signal (j') representing an absolute value of the amplitude is supplied to a latch circuit 22.

Figure 2:
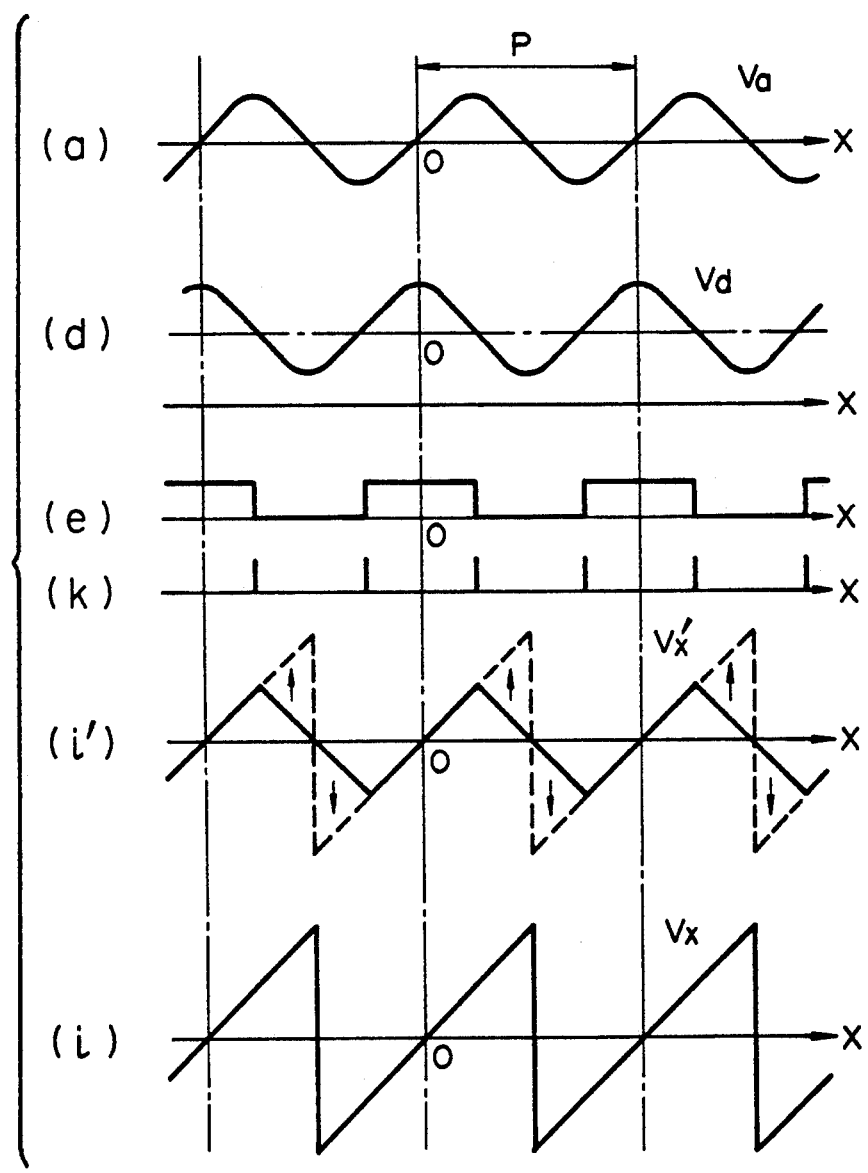
FIG. 2 shows waveforms in the first embodiment.

On the other hand, an edge detector 25 detects a leading edge and a trailing edge of an on-track signal (e) which is derived by reshaping a tracking sum signal (d) shown in FIG. 2 to produce an edge detection signal (k). Since a level of the on-track signal (e) changes when the amplitude of the tracking error signal (a) is maximum, an amplitude A of the tracking error signal (a) is detected by latching the output (j') of the absolute value circuit 21 in response to the latch circuit 22 of FIG. 1 at the timing of the edge detection signal (k).

A calculation result of a formula (1) for the amplitude A of the tracking error signal (a) and a level Va of the tracking error signal (a) when the on-track signal (e) is High, that is, where $|X|<(P/4)$, is stored in a ROM 23, and a result of correction as shown by broken lines and arrows in (i) of FIG. 2 when the on-track signal is Low, that is, where $(P/4) \leq |X| <(P/2)$, is stored in the ROM 23.

$$Vx = \frac{P}{2\pi} \sin^{-1} \frac{Va}{A} \quad (1)$$

The data stored in the ROM 23 is supplied to a D/A converter 24 in accordance with the output (b) of the A/D converter 20, the amplitude signal (j), the output of the latch circuit 22 and the on-track signal (e). Thus, the D/A converter 24 produces a signal (i) which has a linear characteristic representing a relative position of a light beam and a track.

Figure 4:
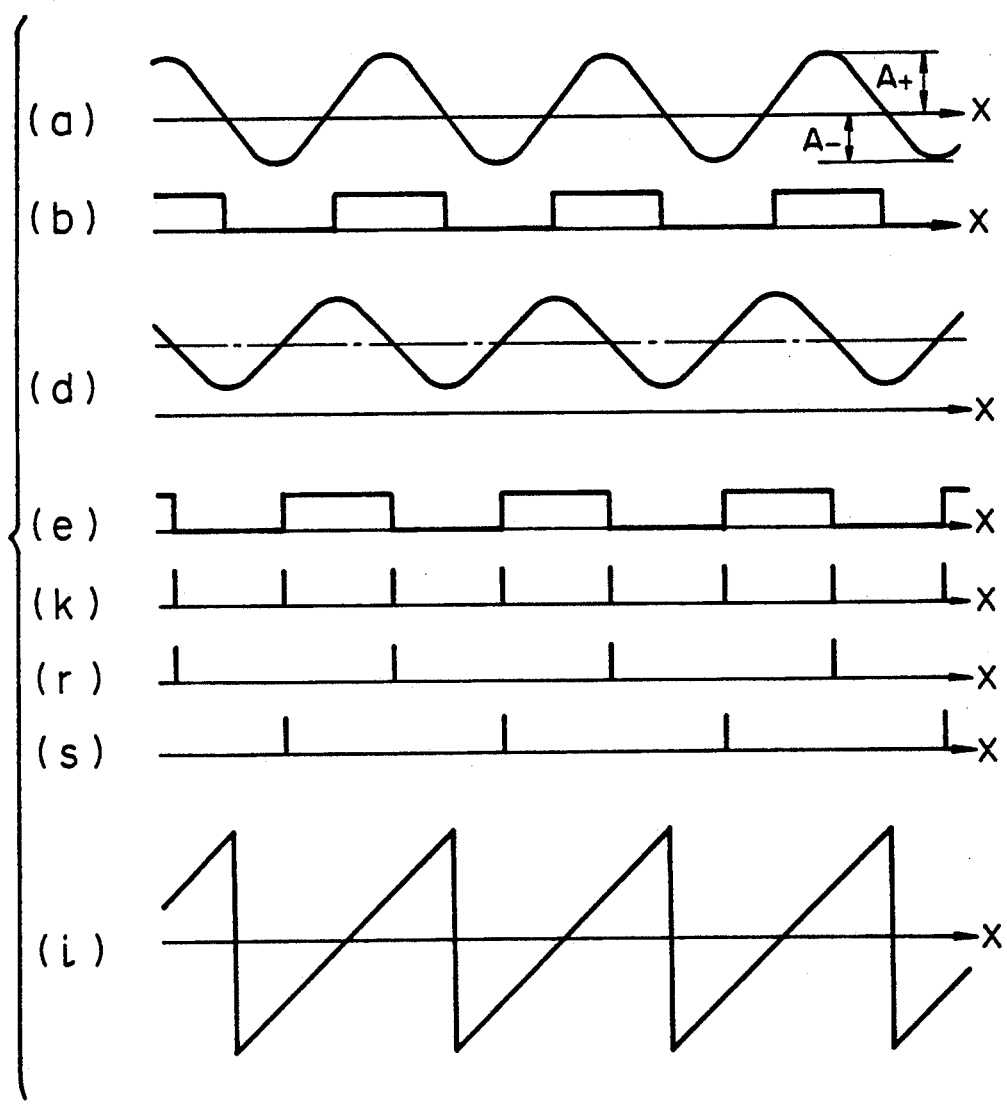
FIG. 4 shows waveforms in the second embodiment.

A second embodiment of the present invention is shown in FIG. 3, and waveforms of the embodiment of FIG. 3 are shown in FIG. 4. The elements in FIGS. 3 and 4 which are the same as those in FIGS. 1 and 2 are designated by like numerals or characters, and the explanation thereof is omitted.

In the present embodiment, the amplitude of the tracking error signal (a) is asymmetric for positive and negative tracking errors as shown in FIG. 4. The amplitude A of the tracking error signal (a) is detected separately for the positive and negative error signals. When the error signal (a) is positive, a positive amplitude A+ is used, and when the error signal (a) is negative, a negative amplitude A− is used.

In FIG. 3, the output (k) of the edge detection circuit 25 is ANDed with the polarity signal (b) by the AND gate 31, which produces a signal (r) representing a positive maximum position of the tracking error signal (a). The latch circuit 22a latches the output (j') of the absolute value circuit 21 in response to the output (r) of the AND gate 31 to detect the positive amplitude A+ of the tracking error signal (a). On the other hand, the polarity signal (b) is applied to an AND gate 32 through an inverter 33 to AND the polarity signal (b) and the output (k) of the edge detector 25 so that the AND gate 32 produces a signal (s) representing a negative maximum position of the tracking error signal (a). The latch circuit 22b latches the output (j') of the absolute value circuit 21 in response to the output (s) of the AND gate 32 to detect the negative amplitude A− of the tracking error signal (a). The outputs of the latch circuits 22a and 22b are supplied to a multiplexer 34 which selectively outputs a signal representing the positive amplitude A+ or the negative amplitude A− of the tracking error signal in accordance with the polarity signal (b). A calculation result of the formula (1) for the amplitude A of the tracking error signal (a) and the level Va of the tracking error signal (a) when the tracking signal (e) is High, that is, where $|X|<(P/4)$, is stored in the ROM 23, and a result of correction shown by broken lines and arrows in (i') of FIG. 2 when the on-track signal is Low, that is, where $(P/4) \leq |X| <(P/2)$, is stored in the ROM 23. The data stored in the ROM 23 is supplied to the D/A converter 24 in accordance with the output (b) of the A/D converter 20, the amplitude signal (j), the output of the multiplexer 34 and the on-track signal (e). The D/A converter 24 produces the signal (i) having a substantially linear characteristic representing the relative position of the light beam and the track.

In the present embodiment, since the amplitudes of the tracking error signal (a) are asymmetric for the positive and negative tracking errors and they are not sinusoidal, the signal (i) produced by the D/A converter 24 slightly deviates from the linear characteristic representing the relative position of the light beam and the track, but a signal having symmetric positive and negative levels is produced. As can be seen from FIG. 4, the signal (i) has a substantially linear characteristic between the positive and negative levels such that it has a substantially sawtooth characteristic overall.

Figure 5:
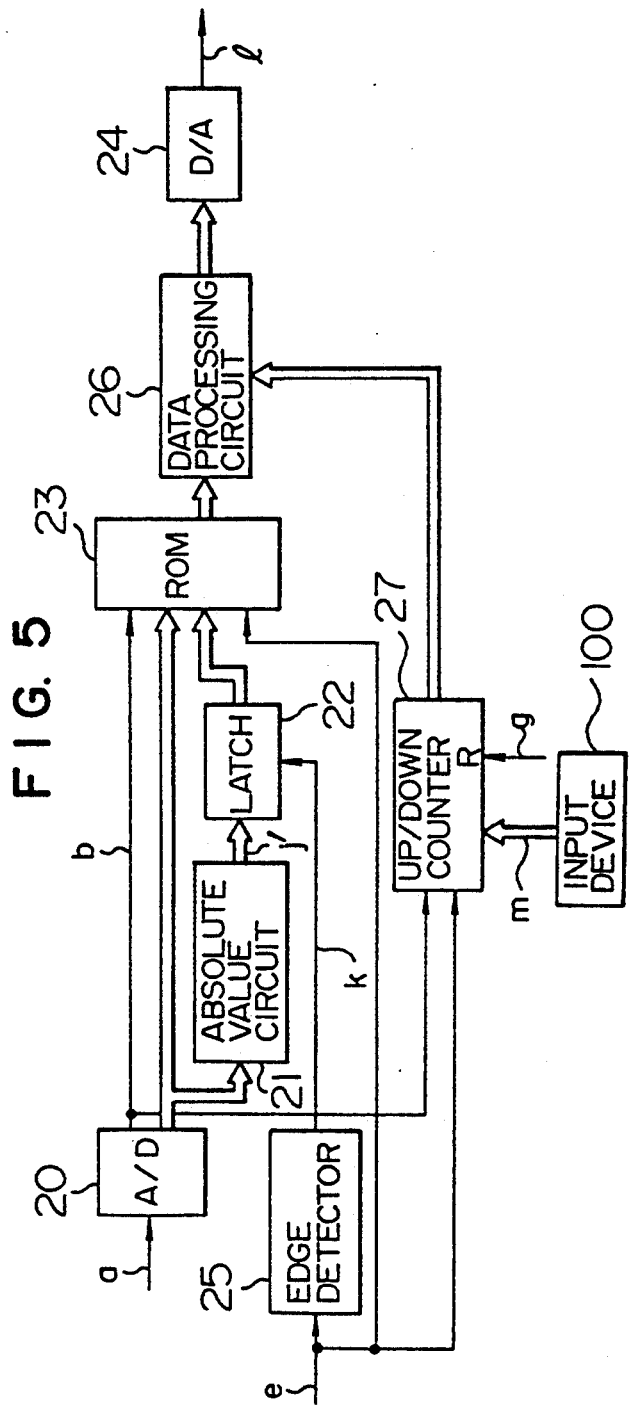
FIG. 5 shows a block diagram of a third embodiment of the present invention.
Figure 6:
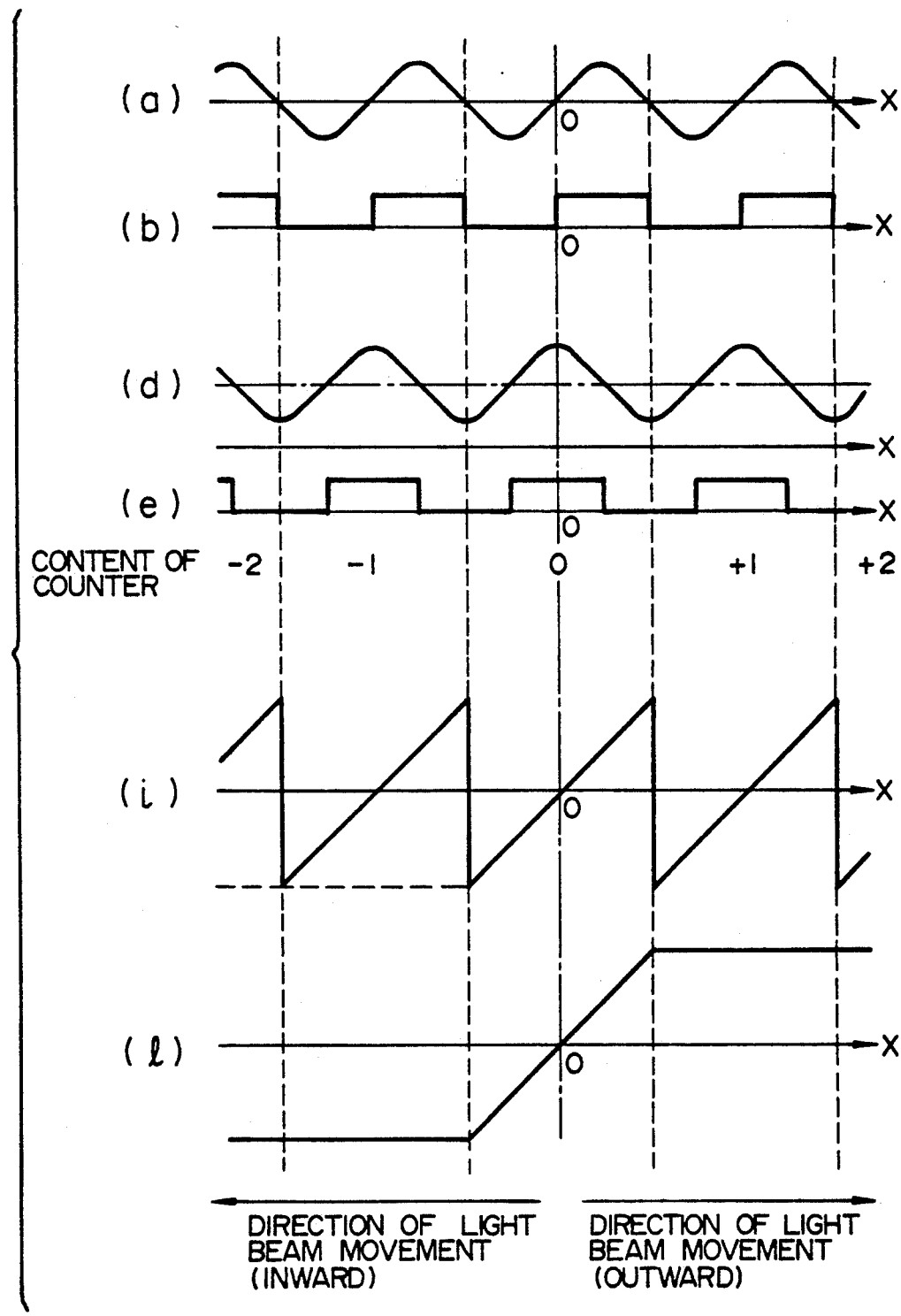
FIG. 6 shows waveforms in the third embodiment.

FIG. 5 shows a third embodiment of the present invention, and FIG. 6 shows waveforms of the embodiment of FIG. 5. In FIGS. 5 and 6, the elements which are the same as those shown in FIGS. 1 and 2 are designated by like numerals or letters and explanation thereof is omitted.

In the present embodiment, the polarity signal (b) and the on-track signal (e) are applied to an up/down counter 27, which counts down when the light beam moves inwardly on the disk and the on-track signal (e) is Low and the polarity signal (b) changes from Low to High, and counts up when the light beam moves outwardly on the disk and the on-track signal (e) is Low and the polarity signal (b) changes from High to Low. A signal (g) for opening and closing a tracking control loop is applied to a reset terminal of the up/down counter 27 so that it is reset when the tracking control loop is open and the reset is released when the tracking control loop is closed. Accordingly, in a random access operation, the reset is released when the light beam reaches the target track and the tracking control loop is closed. The output of the up/down counter 27 is applied to a data processing circuit 26, which produces the output of the ROM 23 as it is when the content of the counter 27 is zero, produces an output indicating a minimum level, for example, (0, ----, 0) when the content of the counter 27 is negative, and produces an output indicating a maximum level, for example, (1, ----, 1) when the content of the counter is positive. The output of the data processing circuit 26 is converted to an analog signal by the D/A converter 24. As shown in FIG. 6($l$), the signal polarity does not change when $|X|=(P/2)$ and the signal level is zero only at the target track.

In the present embodiment, an external input device 100 may be connected to the up/down counter 27 to externally set the count so that the signal level is zero only at the target track. In this manner, the light beam may be moved to the target track by a so-called track jump.

Figure 7:
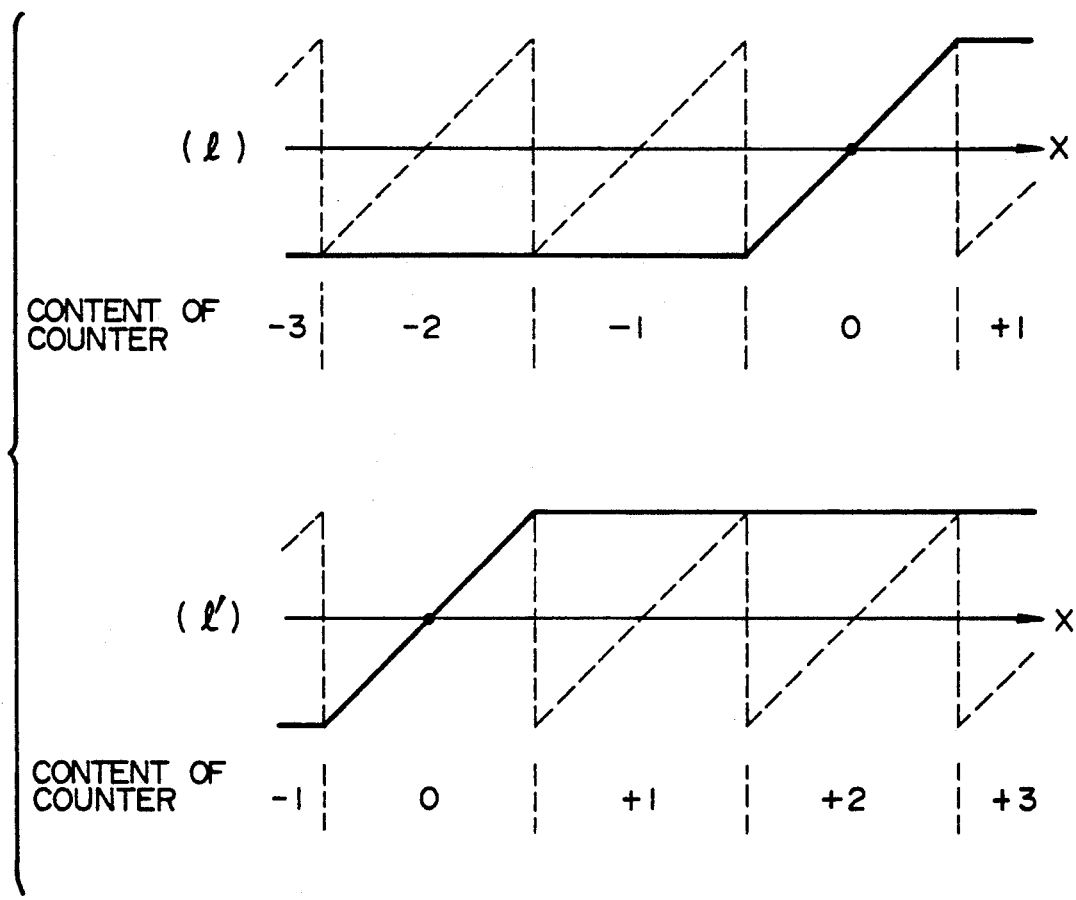
FIG. 7 illustrates a track jump operation in the third embodiment.

The operation of the track jump is explained with reference to FIG. 7. When the target track is reproduced, the signal level is zero only at the target track as shown in signal (l) shown in FIG. 7. Thus, the target track is a sole stable point. The output of the up/down counter 27 is now zero. If the content of the counter 27 is set to "2", for example, by a signal (m) from the input device 100, the content of the counter is zero (the stable point) at two tracks ahead as shown in signal (l') shown by solid lines in FIG. 7 and the light beam moves to that position. In this manner, the track jump is performed. The ±n track jump may be attained by setting the content of the counter to ±n in accordance with the jump direction and the number of tracks to jump.

Figure 8:
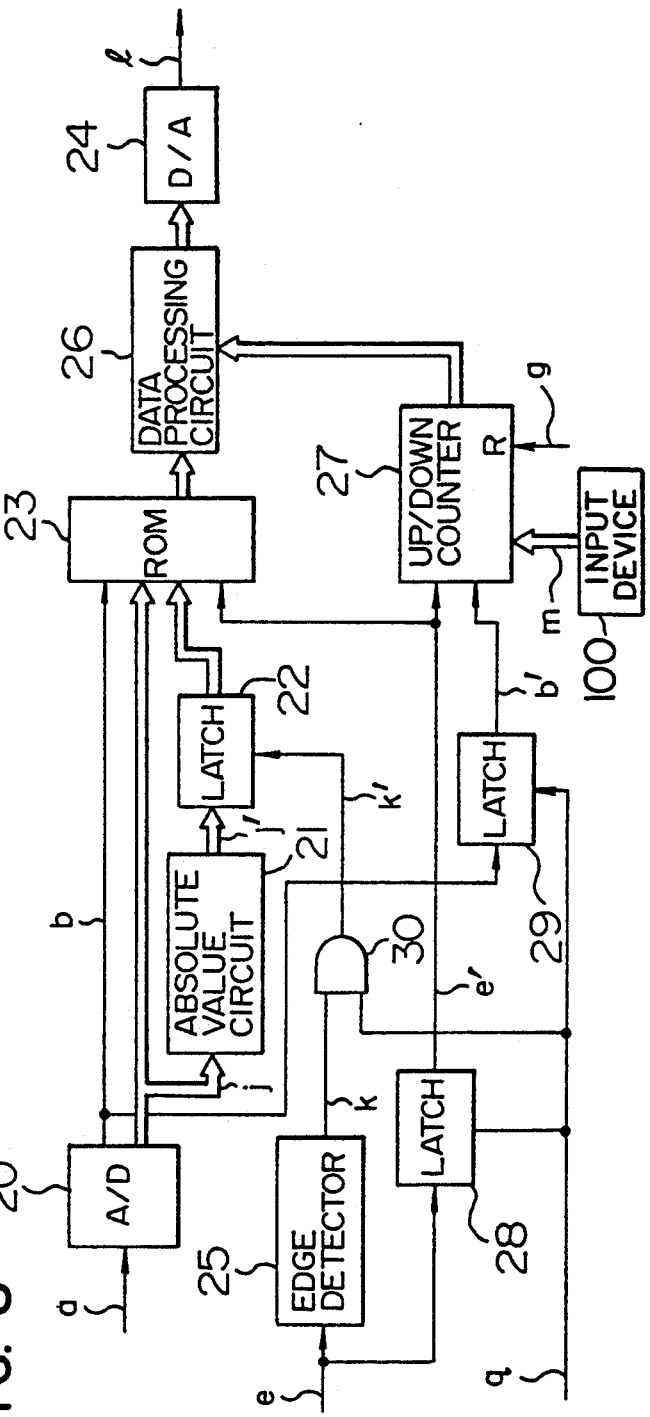
FIG. 8 shows a block diagram of a fourth embodiment of the present invention.
Figure 9:
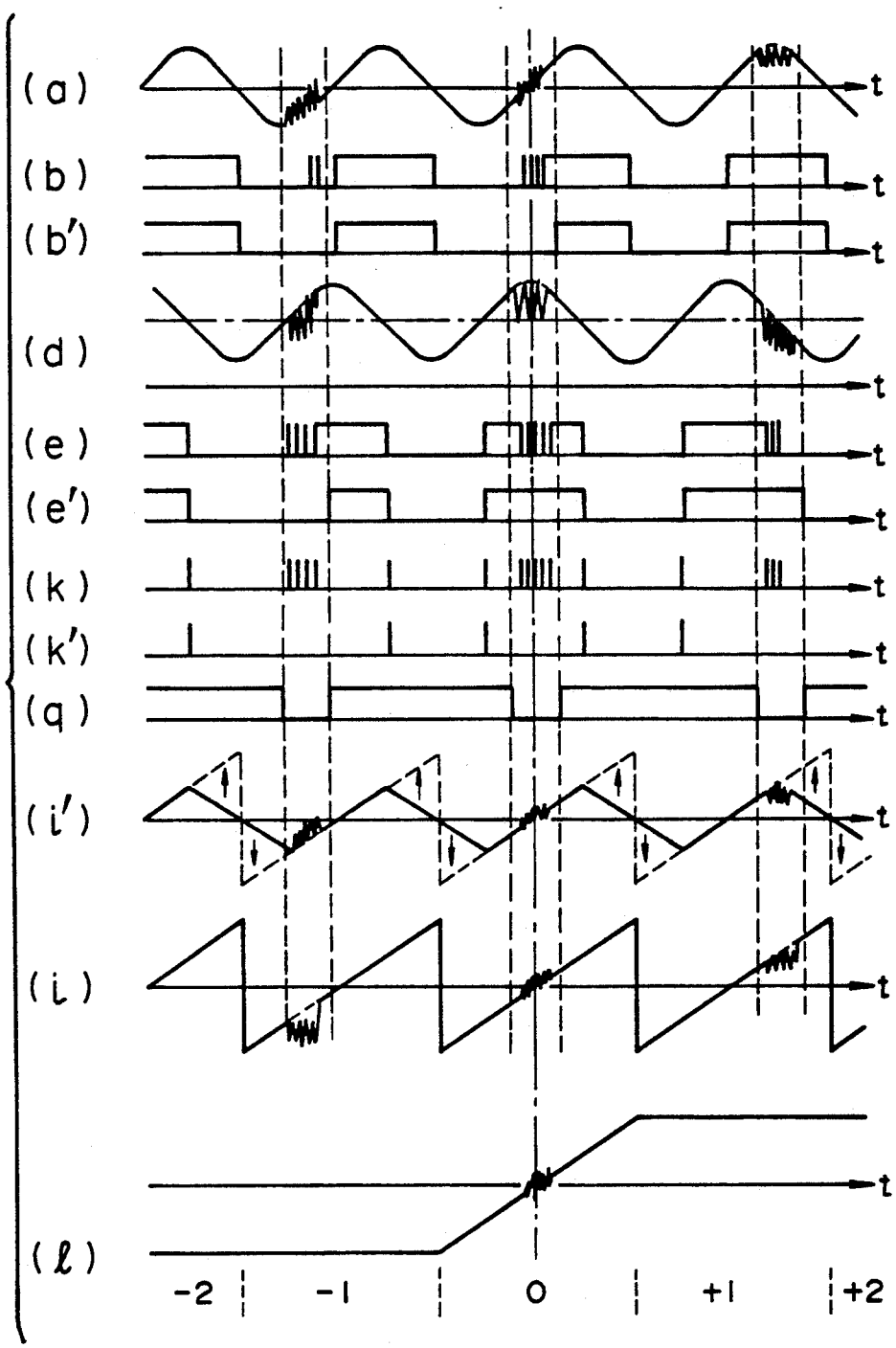
FIG. 9 shows waveforms in the fourth embodiment.

FIG. 8 shows a fourth embodiment of the present invention, and FIG. 9 shows waveforms of the embodiment of FIG. 8. In FIGS. 8 and 9, the elements which are the same as those shown in FIGS. 5 and 6 are designated by the like numerals or letters and explanation thereof is omitted.

In an optical disk, address information of each track is indicated by pits in a track groove. In the address information recording area, signal waveforms are distored as shown by the tracking error signal (a) and the tracking sum signal (d) of FIG. 9. As a result, the polarity signal (b) or the on-track signal (e) may be erroneously produced and the number of tracks to the target track and the amplitude A of the tracking error signal (a) may be misdetected. In the present embodiment, such misdetection is prevented by using a signal (q) which indicates the address information recording area.

In FIG. 8, the signal (q) which indicates the address information recording area of the track is supplied to latch circuits 28 and 29 and an AND gate 30. The edge detection signal (k) produced by the edge detection circuit 25 is ANDed with the signal (q) by the AND gate 30 and an output signal (k') thereof is applied to the latch circuit 22, which latches the output (j') of the absolute value circuit 21 in response to the output (k') of the AND gate 30 to detect the amplitude A of the tracking error signal (a). The latch circuit 28 latches the on-track signal (e) while the signal (q) is Low. The latch circuit 29 latches the polarity signal (b) while the signal (q) is Low. The up/down counter 27 counts down when the light beam moves inwardly on the disk and the output (e') of the latch circuit 28 is Low and the output (b') of the latch circuit 29 changes from Low to High, and counts up when the light beam moves outwardly on the disk and the output (e') of the latch circuit 28 is Low and the output (b') of the latch circuit 29 changes from High to Low. The output of the latch circuit 28 is also applied to the ROM 23, and when the output (e') of the latch circuit 28 is Low, the corrected data as shown by broken lines and arrows in (i') of FIG. 9 is supplied to the data processing circuit 26. The output of the up/down counter 27 is also applied to the data processing circuit 26, which produces the output of the ROM 23 as it is when the content of the counter is zero, produces a signal indicating a minimum level when the content of the counter is negative, and produces a signal indicating a maximum level when the content of the counter is positive. The output of the data processing circuit 26 is converted 24 to an analog signal by the D/A converter, which produces a signal (l) whose signal level is zero only at the target track.

In the present embodiment, since the edge detection signal (k) generated by the address information recording area is masked by the signal (q), the misdetection of the amplitude A of the tracking error signal (a) is prevented. Further, since the signals (b') and (e') which hold the immediately preceding level of the address information recorded area are applied to the up/down counter 27 in place of the polarity signal (b) and the on-track signal (e), respectively, there is no risk of misoperation by a pulse generated by the address information recording area. In the present embodiment, the ±n track jump is attained by setting the content of the up/down counter 27 to ±n in accordance with the direction of jump and the number of tracks to jump, as it is in the embodiment of FIG. 5.

In the above embodiment, if only the positive or negative edge of the tracking error signal (a) is to be detected, the absolute value circuit 21 is not necessary. While the latch circuit 22 latches the absolute value of the amplitude A of the tracking error signal (a) in the above embodiment, it may latch the polarity of the tracking error signal (a), that is, the polarity signal (b) as well and supply it to the ROM 23. In this case, the absolute value circuit 21 is not necessary, but the ROM 23 must store the data including the polarity of the amplitude A and thus must have twice the capacity. Alternatively, only the data relating to the positive edge of the tracking error signal (a) may be stored in the ROM 23 and the output of the ROM 23 may be inverted in accordance with the polarity signal (b) to get the data of the negative edge. In this case, the capacity of the ROM 23 may be reduced by one half. Further, instead of detecting the amplitude at every edge of the on-track signal (e), it may be detected only at the start time or at the track jump, or data of a plurality of detections may be averaged. When the amplitude (A) of the tracking error signal (a) is always kept constant by an automatic gain control (AGC) circuit (not shown), it is not necessary to latch the amplitude A but only the outputs (b)

and (j) of the A/D converter 20 and the on-track signal (e) may be supplied to the ROM 23. In this case, the absolute value circuit 21 and the latch circuit 22 are not necessary and the capacity of the ROM 23 may be small.

If the amplitude A of the tracking error signal (a) is detected smaller than an actual value due to the shift of timing of the on-track signal (e) or the offset of the tracking error signal (a), it may happen that $(Va/A) > 1$. In this case, there is no solution to the formula (1). Since the condition of $(Va/A) > 1$ takes place when the amplitude of the tracking error signal (a) is maximum, that is, in the vicinity of $|X| = (P/4)$, the value at $|X| = (P/4)$ may be stored in the ROM 23 and it may be read out when $(Va/A) > 1$.

Various other modifications may be made. In essence, the tracking error signal having the sinusoidal characteristic representing the relative position of the light beam and the track is changed to have the linear characteristic representing the relative position by using the amplitude A of the tracking error signal (a) and the tracking error signal (a) in accordance with the formula (1).

The present invention offers the following effects.

(1) Since the tracking error signal having the sinusoidal characteristic representing the relative position of the light beam and the track is changed to have the linear characteristic representing the relative position by using only the tracking error signal, the present application is applicable even if the amplitudes of the tracking error signal and the tracking sum signal are not equal $(A \neq D)$ and the ratio of amplitudes $(A/D)$ is not constant.

(2) The sole pull-in stable point is attained by assuring that the polarity of the signal does not change at $|X| = (P/2)$ and the signal level is zero only at the target track so that a force toward the target track is always applied to the actuator and the light beam is positively pulled onto the target track. Since the stable point is only at the target track, the light beam is pulled back onto the target track even if it is significantly shifted from the target track by a disturbance.

(3) The amplitude of the signal produced by the D/A converter does not depend on the amplitude of the tracking error signal but is always constant. The effect of the automatic gain control circuit is also expected.

What is claimed is:

1. A tracking control apparatus including an information recording and reproducing medium having tracks for recording and reproducing information by a light beam, comprising:

signal generation means for generating a signal proportional to a displacement between the light beam and a target track form a signal indicating a positioning error between the light beam and the target track and a signal indicating whether the light beam is on the target track or off the target track, in which the signal output form said signal generation means is a control signal used in tracking control means such that the light beam traces the target track and is moved transversely to the tracks of said information recording and reproducing medium;

wherein said signal generation means includes:

analog/digital conversion means for digitizing the signal indicating the positioning error between the light beam and the target track;

amplitude detection means for detecting an amplitude of the signal indicating the positioning error between the light beam and the target track;

memory means for receiving an output signal from said analog/digital conversion means, an output signal from said amplitude detection means, and the signal indicating whether the light beam is on the target track or off the target track thereby to output a stored displacement of the light beam relative to the target track; and digital/analog conversion means for converting an output from said memory means into an analog signal.

2. A tracking control apparatus including an information recording and reproducing medium having tracks for recording and reproducing information by a light beam, comprising:

signal generation means for generating a signal proportional to a displacement between the light beam and a target track from a signal indicating a positioning error between the light beam and the target track and a signal indicating whether the light beam is on the target track or off the target track, in which the signal output from said signal generation means is a control signal used in tracking control means such that the light beam traces the target track and is moved transversely to the tracks of said information recording and reproducing medium;

wherein said signal generation means includes:

analog/digital conversion means for digitizing the signal indicating the positioning error between the light beam and the target track;

amplitude detection means for detecting an amplitude of the signal indicating the positioning error between the light beam and the target track;

memory means for receiving an output signal from said analog/digital conversion means, an output signal form said amplitude detecting means, and the signal indicating whether the light beam is on the target track or off the target track thereby to output a stored displacement of the light beam relative to the target track;

counter means for counting up and down in response to the signal indicating the positioning error between the light beam and the target track and the signal indicating whether the light beam is on the target track or off the target track;

data processing means connected to said memory means for processing an output form said memory means in response to an output from said counter means; and digital/analog conversion means connected to said data processing means, for converting an output form said data processing means into an analog signal;

wherein said data processing means detects the displacement and a direction thereof between the light beam and the target track in response to the output of said counter means and supplies the output from said memory means to said digital/analog conversion means when the light beam is on the target track, and supplies the output form said counter means to said digital/analog conversion means when the light beam is off the target track.

3. A tracking control apparatus according to claim 2, wherein said counter means includes external input setting means for externally setting the counting value of said counter means.

4. A tracking control apparatus including an information recording and reproducing medium having tracks for recording and reproducing information with a light beam, comprising:
   signal generation means for generating a tracking control signal proportional to a displacement between the light beam and a target track form a signal indicating a positioning error between the light beam and the target track and a signal indicating whether the light beam is on the target track or off the target track; and
   tracking control means responsive to the tracking control signal for controlling tracking of the light beam such that the light beam traces the target track and is moved transversely to the tracks of said information recording and reproducing medium;
   wherein the signal indicating the positioning error between the light beam and the target track has a first characteristic representing a displacement of the light beam relative to the target track, and the tracking control signal has a second characteristic representing a displacement of the light beam relative to the target track, the second characteristic being different from the first characteristic; and
   wherein the first characteristic is a substantially sinusoidal characteristic, and the second characteristic is a substantially sawtooth characteristic.

5. A tracking control apparatus including an information recording and reproducing medium having tracks for recording and reproducing information with a light beam, comprising:
   signal generation means for generating a tracking control signal proportional to a displacement between the light beam and a target track form a signal indicating a positioning error between the light beam and the target track and a signal indicating whether the light beam is on the target track or off the target track; and
   tracking control means responsive to the tracking control signal for controlling tracking of the light beam such that the light beam traces the target track and is moved transversely to the tracks of said information recording and reproducing medium;
   wherein the signal indicating the positioning error between the light beam and the target track has a first characteristic representing a displacement of the light beam relative to the target track, and the tracking control signal has a second characteristic representing a displacement of the light beam relative to the target track, the second characteristic being different from the first characteristic; and
   wherein the signal generation means includes:
   analog/digital conversion means for digitizing the signal indicating the positioning error between the light beam and target track;
   amplitude detection means for detecting an amplitude of the signal indicating the positioning error between the light beam and the target track;
   memory means for
   storing displacement data indicative of a displacement of the light beam relative to the target track,
   receiving an output signal form the analog/digital conversion means, an output signal form the amplitude detection means, and the signal indicating whether the light beam is on the target track or off the target track, and
   outputting stored displacement data in response to the output signal form the analog/digital conversion means, the output signal from the amplitude detection means, and the signal indicating whether the light beam is on the target track or off the target track; and
   digital/analog conversion means for converting the displacement data output form the memory means to an analog signal, the analog signal being supplied to the tracking control means as the tracking control signal.

6. A tracking control apparatus according to claim 5, wherein the amplitude detection means detects a maximum amplitude of the signal indicating the positioning error between the light beam and the target track.

7. A tracking control apparatus according to claim 6, wherein the amplitude detection means includes:
   means for detecting a positive maximum amplitude and a negative maximum amplitude of the signal indicating the positioning error between the light beam and the target track; and
   means for outputting the positive maximum amplitude as the output signal of the amplitude detection means when the signal indicating the positioning error between the light beam and the target track has a positive value, and outputting the negative maximum amplitude as the output signal of the amplitude detection means when the signal indicating the positioning error between the light beam and the target track has a negative value.

8. A tracking control apparatus including an information recording and reproducing medium having tracks for recording and reproducing information with a light beam, comprising:
   signal generation means for generating a tracking control signal proportional to a displacement between the light beam and a target track form a signal indicating a positioning error between the light beam and the target track and a signal indicating whether the light beam is on the target track or off the target track; and
   tracking control means responsive to the tracking control signal for controlling tracking of the light beam such that the light beam traces the target track and is moved transversely to the tracks of said information recording and reproducing medium;
   wherein the signal indicating the positioning error between the light beam and the target track has a first characteristic representing a displacement of the light beam relative to the target track, and the tracking control signal has a second characteristic representing a displacement of the light beam relative to the target track, the second characteristic being different from the first characteristic; and
   wherein the signal generation means includes:
   analog/digital conversion means for digitizing the signal indicating the positioning error between the light beam and target track;
   amplitude detection means for detecting an amplitude of the signal indicating the positioning error between the light beam and the target track;
   memory means for storing displacement data indicative of a displacement of the light beam relative to the target track, receiving an output signal from the analog/digital conversion means, an output signal from the amplitude detection means, and the signal indicating whether the light beam is on the target track or off the target track, and outputting stored displacement data in response to the output signal form the analog/digital conversion means, the output signal form the amplitude detection means, and the signal indicating whether the light beam is on the target track or off the target track;

counter means for counting a counting value up and down in response to the signal indicating the positioning error between the light beam and the target track and the signal indicating whether the light beam is on the target track or off the target track;

data processing means for receiving the displacement data output from the memory means and the counting value of the counter means, detecting a displacement between the light beam and the target track and a direction of the displacement based on the output of the counter means, outputting the displacement data output from the memory means as an output signal of the data processing means when the displacement detected by the data processing means indicates that the light beam is on the target track, outputting a predetermined negative value as the output signal of the data processing means when the displacement detected by the data processing means indicates that the light beam is not on the target track and the direction of the displacement detected by the data processing means indicates that the displacement is in a first direction transverse to the tracks on the information recording and reproducing medium, and outputting a predetermined positive value as the output signal of the data processing means when the displacement detected by the data processing means indicates that the light beam is not on the target track and the direction of the displacement detected by the data processing means is a second direction opposite to the first direction; and digital/analog conversion means for converting the output signal of the data processing means t an analog signal, the analog signal being supplied to the tracking control means as the tracking control signal.

9. A tracking control apparatus according to claim 8, further comprising input means for presetting the counting value of the counter means to a counting value indicative of a number of tracks on the information recording and reproducing medium to be jumped by the tracking control apparatus.

10. A tracking control apparatus according to claim 8, wherein the tracks on the information recording and reproducing medium include address information recording areas on which address information is recorded, and wherein the tracking control apparatus further comprises means for preventing the signal generation means from generating an erroneous tracking control signal due to the address information recorded in the address information recording areas.

* * * * *